United States Patent [19]

Utsui et al.

[11] 4,103,575

[45] Aug. 1, 1978

[54] SYNCHRONOUS WEB CUTTING APPARATUS

[75] Inventors: Masaaki Utsui; Hikaru Tsuruta; Shigemitsu Mizutani; Shigehisa Shimizu, all of Minami-ashigara, Japan

[73] Assignee: Fuji Photo Film Co., Ltd., Minami-ashigara, Japan

[21] Appl. No.: 819,918

[22] Filed: Jul. 28, 1977

[30] Foreign Application Priority Data

Jul. 29, 1976 [JP] Japan .................................. 51-90494

[51] Int. Cl.² ........................................... B23D 25/04
[52] U.S. Cl. ......................................... 83/298; 83/320
[58] Field of Search .................. 83/298, 284, 318, 320

[56] References Cited

U.S. PATENT DOCUMENTS

| 3,712,165 | 1/1973 | Meyer | 83/298 |
| 3,799,018 | 3/1974 | Mumford | 83/298 |
| 3,921,484 | 11/1975 | Rasenberger | 83/320 |

Primary Examiner—Donald R. Schran
Attorney, Agent, or Firm—Sughrue, Rothwell, Mion, Zinn and Macpeak

[57] ABSTRACT

An apparatus for cutting a continuously horizontally moving web into desired lengths comprises a first slider crank mechanism 21 for horizontally reciprocating a first slider 71 mounting relatively reciprocable cutting edges 81, 82 disposed below and above the web, a second slider crank mechanism 22 for vertically reciprocating the upper cutting edge 82 via a second slider 72 to sever the web, and a third slider crank mechanism 23 for horizontally reciprocating a third slider 73 mounting a torque balancing weight 83. All three mechanisms are driven by a common rotary shaft 13, and the angles between the crank arms of the mechanisms and the magnitude of the balancing weight are selected such that the shaft torque is substantially constant over the cutting region whereat the first slider moves at a substantially constant speed approximately equal to that of the travelling web.

3 Claims, 6 Drawing Figures

SYNCHRONOUS WEB CUTTING APPARATUS

BACKGROUND OF THE INVENTION

1. Field of the Invention

This invention relates to an apparatus for repetitively cutting a continuously moving web into desired lengths.

The term web as used herein is intended to mean a flexible and relatively long web-like material whose thickness is from 5 μ to 5 mm and whose width is from 10 cm to 3 m, for example, such as plastic films comprised of polyvinyl chloride, polycarbonate, acrylonitrile-styrene copolymer, ABC resin, polyester, polyester resin containing glass fiber, cellulose inductives, etc., sheets such as paper, synthetic paper, etc., and thin metal plates such as aluminum, copper, etc.

2. Description of the Prior Art

A web is generally wound onto a roll during manufacture, and is thereafter unwound during working and cut into desired lengths in accordance with the intended uses thereof. To efficiently cut the web various devices have been used, one of which comprises a pair of rotary knife edges oppositely disposed above and below the web and adapted to be driven at the same peripheral speed as the web to thereby cut it into desired lengths by the engagement of the edges with each other. Another device used is a sliding carriage type of cutter, which comprises an upper knife edge movable up and down with respect to a lower knife edge, with the travelling web disposed therebetween. Both knife edges are simultaneously moved parallel to the web, and at the same time the upper edge is moved downwardly towards the lower edge to cut the web into desired lengths.

In the former device the knife edges are each mounted on individual, rotatable, drum-like supports, so the setting and adjustment of the knife edges for proper cutting engagement is time-consuming and difficult. In addition, the coincidence of the peripheral speeds of the knife edges with each other and with that of the web is difficult to achieve due to mechanical errors such as slip and back-lash in the rotatable supports and drive system for the web, which adversely affects the accuracy of the cut web lengths.

In the latter device the engagement setting of the knife edges and the drive speed control are more easily implemented, as a result of which the accuracy of the cut web lengths has been considerably enhanced. When the cut length error tolerance is less than ± 500 μ, however, it is impossible to obtain sufficient accuracy with existing reciprocating carriage types of web cutters.

Investigations by the present inventors have revealed that when the drive system for moving the upper and lower knife edges parallel to the web and the drive system for moving the upper edge downwardly towards the lower edge operate with a slight time displacement relative to a common drive source, relatively large torque variations result which produce uneven rotation of the drive source. This causes a displacement in the point engagement between the knife edges, i.e. in the point where the web is cut, and such displacement error increases as the speed of the web increases. The drive source for the knife edges generally also serves as the drive source for the web to simplify construction and decrease manufacturing cost, and it is therefore difficult to change the cut length setting of the web and unsuitable for use in cutting webs whose lengths must vary.

SUMMARY OF THE INVENTION

Briefly, and in accordance with the present invention, an apparatus for cutting a continuously horizontally moving web into desired lengths comprises a first slider crank mechanism for horizontally reciprocating a first slider mounting relatively reciprocable cutting edges disposed below and above the web, a second slider crank mechanism for vertically reciprocating the upper cutting edge via a second slider to sever the web, and a third slider crank mechanism for horizontally reciprocating a third slider mounting a torque balancing weight. All three mechanisms are driven by a common rotary shaft, and the angles between the crank arms of the mechanisms and the magnitude of the balancing weight are selected such that the shaft torque is substantially constant over the cutting region whereat the first slider moves at a substantially constant speed approximately equal to that of the travelling web.

DETAILED DESCRIPTION OF THE PREFERRED EMBODIMENTS

Figure 1:
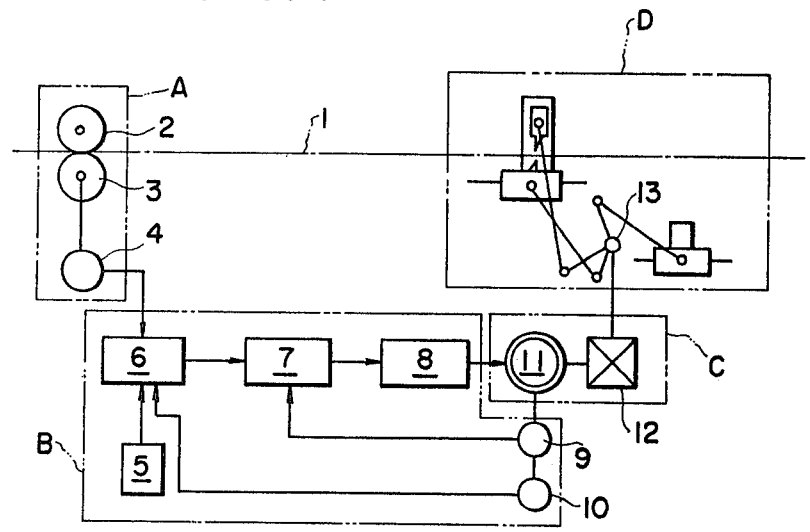
FIG. 1 shows a block diagram of a web cutting apparatus constructed in accordance with the present invention.

Referring now to FIG. 1, the overall web cutting apparatus of the present invention comprises a web length detecting station A, a control station B, a drive source C, and a cutting station D.

During operation a web 1 is driven by a source (not shown) at a suitable speed and continuously transported to the cutting station D. The transported length of the web is detected at station A which comprises a pair of nip rollers 2, 3 and a pulse generator 4 actuated by roller 3, and the pulse generator output is fed to the control station B.

The control station comprises a cut length setter 5, a digital regulator 6, an analog regulator 7, a power supply 8, a tachometer-generator 9, and a pulse generator 10. The digital regulator 6 receives the output signal from the pulse generator 4, a length command input from the cut length setter 5, and a cutting edge position detection signal from the pulse generator 10, and in response supplies a cutting edge speed signal to the analog regulator 7. The latter also receives an input from the tachometer-generator 9, and supplies an output signal through the power supply 8 to the drive source C, which comprises a motor 11 and a reduction gear 12.

Figure 2:
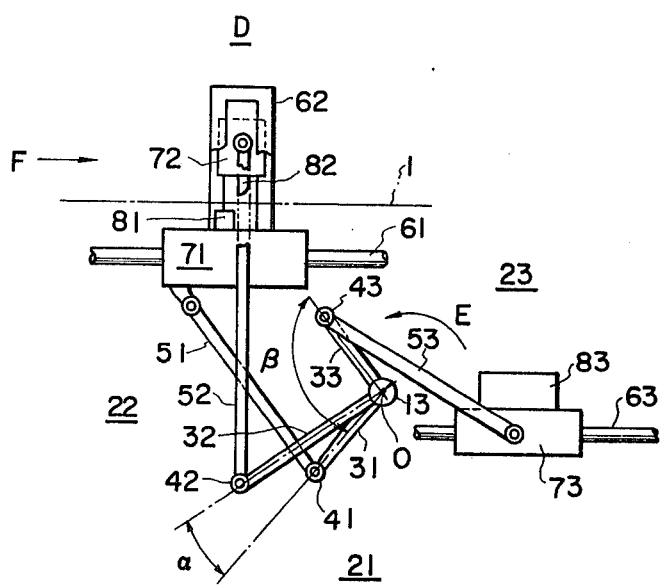
FIG. 2 shows a schematic side view of the cutting station D of the apparatus.

When the web 1 has been cut to the desired length at the cutting station D, the cutting mechanism is returned to a wait position until the next cutting operation is started. The cutting station D (FIG. 2) comprises a main rotary drive shaft 13 connected to an output shaft of the reduction gear 12, first, second and third slider crank mechanisms 21, 22 and 23 adapted to convert the rotating motion of the main shaft 13 into linear reciprocating motions, first and second cutting edges 81, 82 driven by the first and second slider crank mechanisms, and a torque balancer 83. The first slider crank mechanism 21 comprises a crank arm 31 extending from the main shaft 13, a pivot shaft 41 disposed on the end of the crank arm 31, a slider 71 disposed below the web 1 and guided for horizontal movement on a shaft 61 parallel to the web, and a connecting rod 51 coupled between the slider 71 and the pivot shaft 41, whereby the CCW rotation of the main shaft in the direction of arrow E causes the slider 71 to reciprocate in a direction parallel to the web. The slider 71 has a flat upper surface on which the first cutting edge 81 is fixedly supported so that a knife edge thereof extends in a lateral direction beneath the web. A guide frame 62 is also mounted on the slider 71 to vertically guide a slider 72 on which the second cutting edge 82 is mounted with its knife edge directed towards the upper surface of the web. This enables the first slider mechanism 21 to concurrently reciprocate the first and second cutting edges 81, 82 in a direction parallel to the web 1.

The second slider crank mechanism comprises a crank arm 32, a pivot shaft 42 disposed on the end of the crank arm 32, the slider 72, the guide frame 62, and a connecting rod 52 for coupling the slider 72 to the pivot shaft 42, whereby the CCW rotation of the main shaft 13 causes the slider 72 to reciprocate perpendicular to the web. Accordingly, the second cutting edge 82 is positioned opposite the first cutting edge 81 so that their respective knife edges come into frictional contact when the second slider crank mechanism 22 is operated, whereby the web is severed in a lateral direction.

An angle $\alpha$ is formed between the crank arms 31 and 32, and varies with the lengths $r_1$ and $r_2$ (not shown) of the crank arms 31 and 32, respectively, and with the lengths $l_1$ and $l_2$ (not shown) of the connecting rods 51 and 52, respectively. The angle $\alpha$ should normally lie within the ranges of $-22.5° \leq \alpha \leq 22.5°$ or $157.5° \leq \alpha \leq 202.5°$.

The third slider crank mechanism 23 comprises a crank arm 33 extending from the main shaft 13, a pivot shaft 43 disposed on the end of the crank arm 33, a slider 73 disposed below the web 1 and horizontally movable on a guide shaft 63 in a direction parallel to the web, and a connecting rod 53 for coupling the slider 73 to the pivot shaft 43, whereby the rotation of the main shaft 13 in a CCW direction causes the slider 73 to reciprocate in a direction parallel to the web. The torque balancer 83 is mounted on the slider 73, and reciprocates therewith.

An angle $\beta$ is formed between the axes of the crank arms 31 and 33, and varies in value with the angle $\alpha$, the length $r_3$ (not shown) of the crank arm 33, the length $l_3$ (not shown) of the connecting rod 53, and the weight of the torque balancer 83. The angle $\beta$ should normally lie within the ranges of $67.5° \leq \beta \leq 112.5°$ or $247.5° \leq \beta \leq 292.5°$.

In operation, the web 1 is transported in the direction of arrow F at a suitable speed by a separate drive source, and its transported length is detected by station A. When the detected value is in coincidence with the value set in the cut length setter 5, the control station B causes the main shaft 13 in the cutting station D to rotate in the direction of arrow E through the drive source C.

The angular velocity and acceleration of the main shaft 13 are sensed by the pulse generator 10 and the tachometer-generator 9 in station B, which controls the rotational drive of the main shaft 13 so that the knife edges of the first and second cutting edges 81, 82 cooperate with each other to cut the desired portion of the web while moving horizontally therewith through a small distance at substantially the same speed as the web.

The relative position between the second cutting edge 82, which is moved both horizontally and vertically through the first and second slider crank mechanisms 21, 22, and the first cutting edge 81, which is moved horizontally simultaneously with the second cutting edge 82 through the first slider crank mechanism 21, is principally determined by their mounting positions on the upper surface of the slider 71. On the other hand, when the main shaft 13 is rotated at a given speed in the CCW direction, the speed of horizontal movement of the first and second cutting edges in the direction of arrow F passes through a synchronous region at which speed variations are controlled, by the length $r_1$ of the crank arm 31 in the first slider crank mechanism 21, to within a few % of the transport speed of the web 1. The depth of engagement of the second cutting edge 82 with the first cutting edge 81 is determined by the length $r_2$ of the crank arm 32 in the second slider crank mechanism 22. In order to cut the web while the first and second cutting edges are moving at a speed substantially equal to that of the web, that is, while they are moving in the aforementioned synchronous region, the angle $\alpha$ is set within the range described above.

Figure 3:
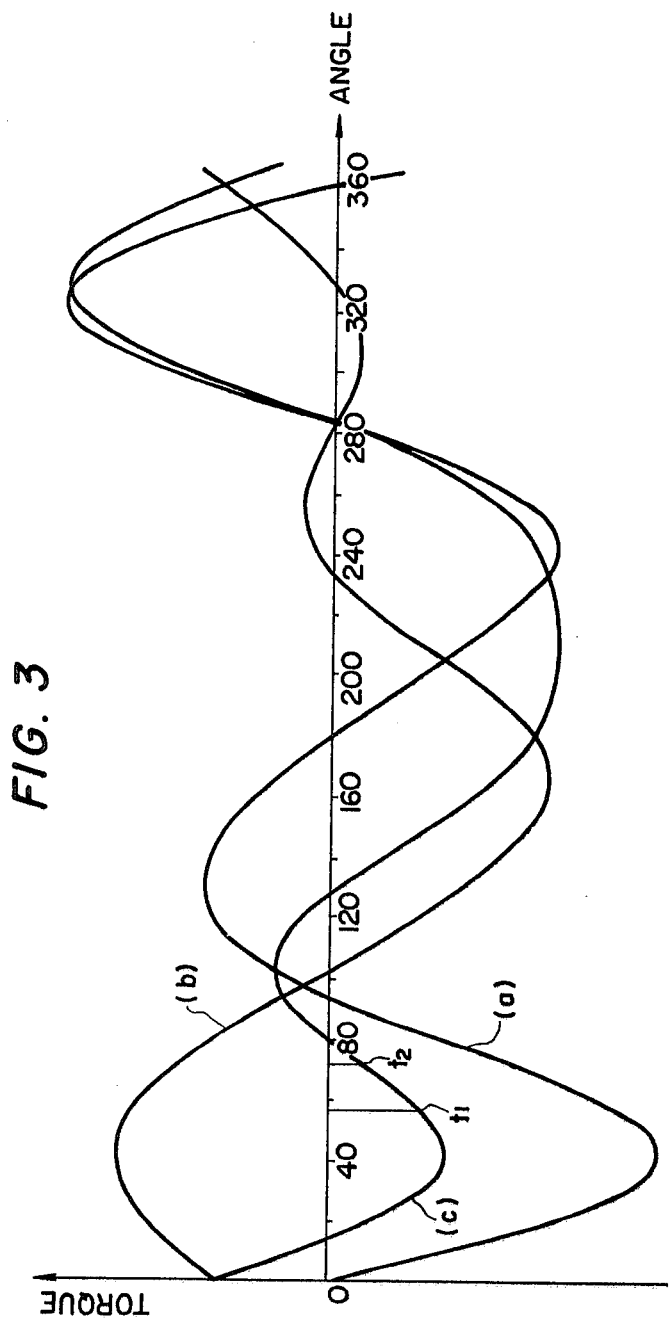
FIGS. 3 and 5 show torque pattern plots of the main rotary drive shaft without and with the third slider crank mechanism and torque balancer, respectively.

When the first and second cutting edges are moved horizontally and vertically, however, torque variations occur in the main shaft 13 as shown by curves (a) and (b) in FIG. 3, which may be combined into a resultant curve (c). Such variations induce unevenness in the rotational speed of the main shaft 13, as a consequence of which the synchronous region $t_1 - t_2$ is impossible to realize which results in errors in the length of the cut web. In view of this drawback, the present invention provides a torque balancer 83 coupled through the third slider crank mechanism 23 to eliminate torque variations in the synchronous or cutting region $t_1 - t_2$.

The optimum parameters for the torque balancer 83 may be calculated as explained hereinafter. Let $C_1$, $C_2$, and $C_3$ be the torque variations due to the cutting of the web through the first and second slider crank mechanisms 21, 22, and due to the operation of the torque balancer 83 through the third slider crank mechanism 23, respectively, whereby the resultant torque Ct is given by:

$$Ct = C_1 + C_2 + C_3 \ldots \qquad (1)$$

The values of these torque variations may be obtained from fundamental equations for the slider crank mechanisms.

Figure 4:
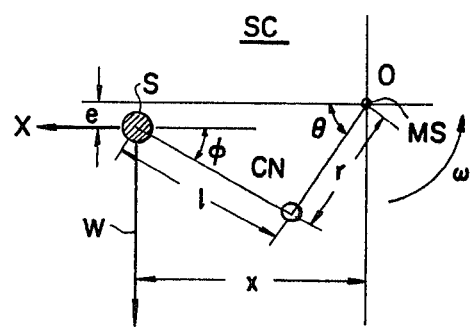
FIG. 4 shows a geometric diagram for the slider crank mechanism.

That is, referring to FIG. 4, given a movable slider crank mechanism SC having a slider S with a lateral offset or deviation (e) and wherein $C^{(1)}$ and $C^{(2)}$ are the torques of the main shaft MS produced by the inertia X of the slider S and the rotating torque T of the connecting rod CN, then:

$$C^{(1)} = +\frac{X}{\omega}\ddot{x} \qquad (2)$$

-continued $$C^{(2)} = + \frac{T}{\omega} \dot{\phi}$$

where $\omega$ is the angular velocity of the main shaft, and:

$$X = - \frac{W}{g} \ddot{x} \qquad (3)$$

$$T = - I' \ddot{\phi}$$

where $I'$ is the equivalent moment of inertia of the connecting rod, and $g$ is the acceleration of gravity. The torque C of the main shaft MS is thus given by:

$$C = C^{(1)} + C^{(2)} = - \frac{1}{\omega} ( \frac{W}{g} \dot{x} \ddot{x} + I' \dot{\phi} \ddot{\phi} ) \qquad (4)$$

In these equations, $\dot{x}$, $\ddot{x}$ are the velocity and acceleration, respectively, of the slider S obtained from the first and second differentiations of $x$ with respect to time $t$ in the following equation:

$$x = r \cos \theta + l \cos \phi \qquad (5),$$

and $\dot{\phi}$, $\ddot{\phi}$ are the angular velocity and acceleration, respectively, of the connecting rod CN obtained from the first and second differentiations of $\phi$ with respect to time in the following equation:

$$\sin \phi = \rho \sin \theta - \epsilon \qquad (6)$$

where, $\rho = r/l$, $\epsilon = e/l$. In either case, the positive direction is that shown in FIG. 4.

Figure 5:
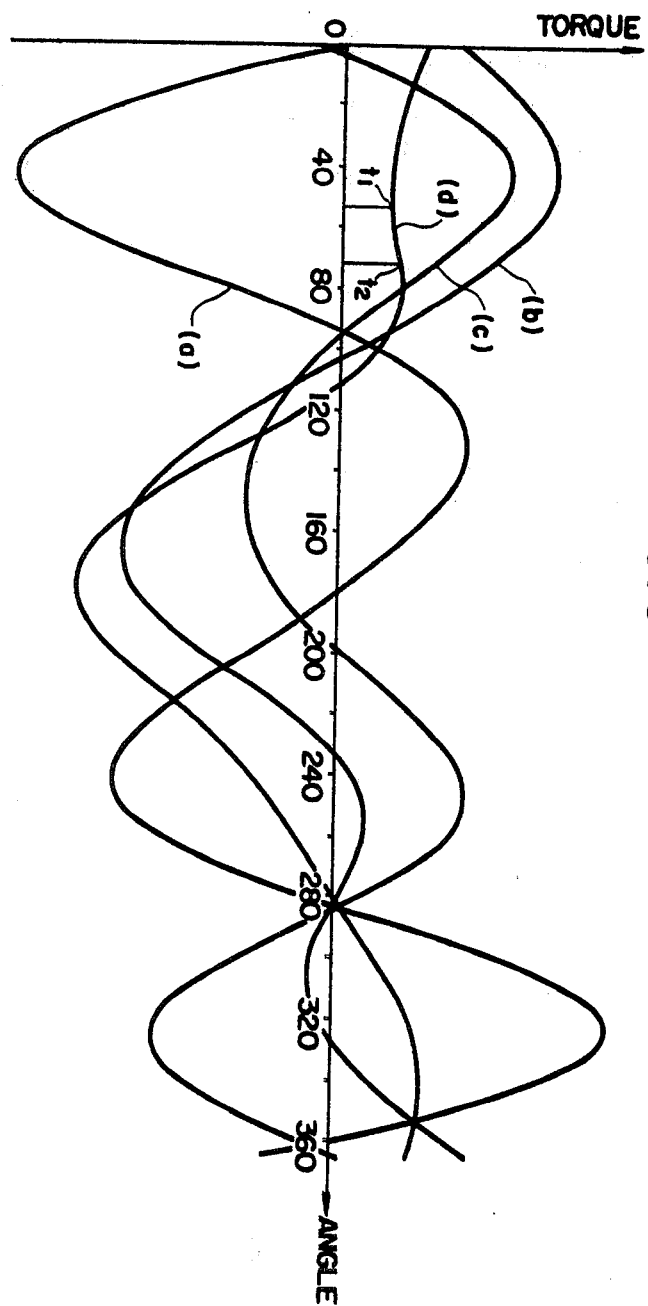

FIG. 5 shows a plot of torque variation patterns acting on the main shaft 13 when the balancer 83 is operated through the third slider crank mechanism 23, said patterns being obtained using design figures derived on the basis of equation (4). In FIG. 5, curve (a) is the torque variation due to the operation of the first slider crank mechanism 21, curve (b) is the torque variation due to the operation of the second slider crank mechanism 22, curve (d) is the torque variation due to the operation of the torque balancer 83 through the third slider crank mechanism 23, and curve (c) is the resultant torque variation curve resulting from a combination of curves (a), (b), and (d).

Comparing both of the resultant torque variation curves (c) shown in FIGS. 3 and 5, a great difference is seen between the degree of variation in the predetermined cutting region $t_1 - t_2$ (corresponding to an angle of rotation of the main shaft 13 from about 50° to 70°). That is, in FIG. 5 the offsetting torque variation of the balancer 83 effectively eliminates other torque variations in the cutting region $t_1 - t_2$ to substantially flatten the resultant torque variation curve (c).

Figure 6:
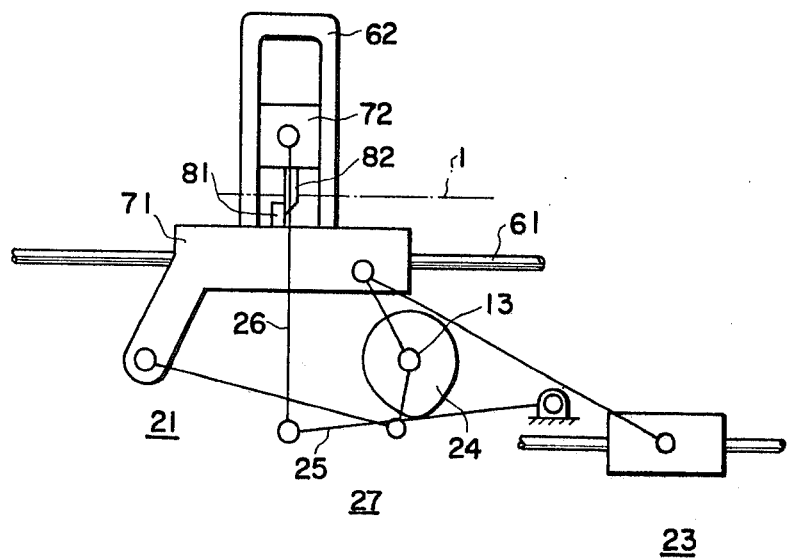
FIG. 6 shows a simplified schematic illustration of a modified second slider crank mechanism.

The second slider crank mechanism 22 may also be replaced by a cam mechanism 27, as shown in FIG. 6, in which an arm 25 is oscillated by a cam 24 which rotates about the main shaft 13, said arm 25 being coupled by a connecting rod 26 to the slider 72. Alternatively, the second cutting edge 82 may be fixed while the first cutting edge 81 is moved towards the edge 82 to cut the web.

The reduction gear 12 may also be removed and a low speed motor directly connected to the main shaft 13, and a suitable mark indicative of a cutting position may be put on the surface of the web 1 beforehand and sensed at station A.

What is claimed is:

1. An apparatus for cutting a web travelling at a constant speed into desired lengths, comprising:
   a. a first slider movable in a direction parallel to the web,
   b. a first cutting member mounted on the first slider on one side of the web,
   c. a second slider mounted on the first slider and movable in a direction perpendicular to the web,
   d. a second cutting member mounted on the second slider on the other side of the web for reciprocating engagement with the first cutting member to cut the web,
   e. a rotary drive shaft,
   f. a drive mechanism connected between the shaft and the first slider for reciprocatingly driving the latter in response to the rotation of the shaft,
   g. a second drive mechanism connected between the shaft and the second slider for reciprocatingly driving the latter in response to the rotation of the shaft,
   h. a movable torque balancer for offsetting shaft torque variations in a cutting region whereat the first slider is being driven at substantially the same speed as the web and in the same direction, and
   i. a third drive mechanism connected between the shaft and the torque balancer, whereby the shaft torque and first slider speed remain substantially constant throughout the cutting region.

2. An apparatus as defined in claim 1, wherein the first, second, and third drive mechanisms include first, second, and third crank arms, respectively, fixedly secured to the drive shaft and extending radially outwardly therefrom, and wherein the angle $\alpha$ between the first and second crank arm lies within the ranges of $-22.5° \leq \alpha \leq 22.5°$ or $157.5° \leq \alpha \leq 202.5°$, and the angle $\beta$ between the first and third crank arms lies within the ranges of $67.5° \leq \beta \leq 112.5°$ or $247.5° \leq \beta \leq 292.5°$.

3. An apparatus as defined in claim 1, wherein the first and third drive mechanisms each include a crank arm fixedly secured to the drive shaft and extending radially outwardly therefrom, and the second drive mechanism includes a cam fixedly secured to the drive shaft and follower means driven by the cam and connected to the second slider.

* * * * *